United States Patent [19]

Niethhammer et al.

[11] 4,428,042

[45] Jan. 24, 1984

[54] INTERFACE DEVICE FOR COUPLING A SYSTEM OF TIME-DIVISION MULTIPLEXED CHANNELS TO A DATA CONCENTRATOR

[75] Inventors: Dieter Niethhammer, Putzbrunn; Robert Eggertsberger, Giessen; Gerhard Wilmers, Munich, all of Fed. Rep. of Germany

[73] Assignee: Siemens Aktiengesellschaft, Berlin & Munich, Fed. Rep. of Germany

[21] Appl. No.: 231,455

[22] Filed: Feb. 4, 1981

[30] Foreign Application Priority Data

Feb. 19, 1980 [DE] Fed. Rep. of Germany ....... 3006165

[51] Int. Cl.³ .......................... G06F 3/00; G06F 15/16
[52] U.S. Cl. .................................... 364/200; 370/92; 370/56
[58] Field of Search ... 364/200 MS File, 900 MS File; 370/92, 100, 56, 58; 375/7, 106

[56] References Cited

U.S. PATENT DOCUMENTS

| 3,639,694 | 2/1972 | Deutsch et al. | 179/15 AL |
|---|---|---|---|
| 4,047,246 | 9/1977 | Kerllenevich et al. | 364/200 |
| 4,065,862 | 1/1978 | Meyer | 364/200 |
| 4,106,091 | 8/1978 | Hepworth et al. | 364/200 |
| 4,205,373 | 5/1980 | Shah et al. | 364/200 |
| 4,271,480 | 6/1981 | Vinot | 364/900 |
| 4,291,370 | 9/1981 | Charles | 364/200 |
| 4,298,928 | 11/1981 | Etoh et al. | 364/200 |
| 4,309,754 | 1/1982 | Dinwiddie, Jr. | 364/200 |
| 4,312,066 | 1/1982 | Bantz et al. | 364/200 |
| 4,328,559 | 5/1982 | Markhasin et al. | 364/900 |
| 4,347,582 | 8/1982 | Frank | 364/900 |
| 4,347,601 | 8/1982 | Schmidt | 370/58 |

Primary Examiner—James D. Thomas
Assistant Examiner—Archie E. Williams
Attorney, Agent, or Firm—Hill, Van Santen, Steadman & Simpson

[57] ABSTRACT

A coupling device provides for an inexpensive coupling between two data processing systems at a relatively low expense, even when a large number of channels is involved. The coupling device provides, for each data processing system, a clock pulse line, a transmitting bus, a receiving bus and an address bus. For each address, two memory cells are provided and have associated address decoders. The address decoders receive the addresses by way of the address buses and with identification of an associated address, transmit decoding signals to the memory cells. A pair of clock pulse controls provide sequences of write commands and read commands for controlling the writing of individual bits of the two transmitting buses into the addressed memory cells and cause transfer of these bits to the receiving buses.

4 Claims, 11 Drawing Figures

INTERFACE DEVICE FOR COUPLING A SYSTEM OF TIME-DIVISION MULTIPLEXED CHANNELS TO A DATA CONCENTRATOR

BACKGROUND OF THE INVENTION

1. Field of the Invention

The present invention relates to a coupling device for coupling a first data processing system to a second data processing system, having a first transmitting bus, a first address bus, a first receiving bus, and a first clock pulse line in the vicinity of the first data processing system, and a second transmitting bus, a second address bus, a second receiving bus and a second clock pulse line in the vicinity of the second data processing system. As the first or second data processing system, for example, in each case a time-division multiplex system can be provided. However, also, as a first data processing system, a time-division multiplex system can be provided, and as a second data processing system, a concentrator can be provided.

2. Description of the Prior Art

According to the prior art, concentrators can be coupled, channel-specific to time-division multiplex systems, whereby for each channel, in each case one channel output circuit, a channel input circuit and a connection line are required. When, for example, a time-division multiplex system is to be connected via 96 channels to a concentrator, then, in addition to 96 connection lines, 96 channel output circuits and 96 channel input circuits must be provided.

SUMMARY OF THE INVENTION

The object of the present invention is to provide a coupling device with the help of which, even in the case of a large number of channels, a coupling may be executed between two data processing systems with relatively low circuit expense.

The above object is achieved, in accordance with the invention, in that, for each address for the first address bus, there is provided a first memory cell, and for each address for the second address bus, a second memory cell is provided. The group of the first memory cells is connected via their data inputs to the first transmitting bus and via their data outputs to the second receiving bus. The group of the second memory cells is connected via their data inputs to the second transmitting bus and via their data outputs to the first receiving bus. The first and second groups of memory cells are connected via decoder lines to address decoders and the address decoders are connected with the first address bus and the second address bus. A first clock pulse control system and a second clock pulse control system are connected to the first and second clock pulse lines and with the help of the first and second clock pulse control systems, sequences of first and second write commands are generated, with which the data of the first and second transmitting buses are transferred into the address memory cells of the first and second groups and the first and second clock pulse control systems generate sequences of first and second read commands with the help of which the data are read from the memory cells of the first and second groups.

A coupling device constructed in accordance with the present invention distinguishes itself by a low circuit expense, because for each channel and address, only one memory cell is required and because the wiring for the connection of the coupling device to the two data processing systems requires a comparatively low expense. A further advantage of the coupling device is in that its memory cells are arranged centrally and therefore can be realized in an inexpensive and space-saving manner with a random access memory (RAM).

In the case that the clock pulse signals transmitted via the two clock pulse lines differ only by a constant phase differential, it is practical that the first and second write commands coincide with the preset pulse edges of the clock pulse signal supply via the first or second clock pulse line and that the first and second read commands are generated after the first or second write command when the second or first clock pulse signal assumes a preset binary value.

In the case that changing phase differentials of the two clock pulse signals and/or varying repetition rates of the clock pulse signals are to be expected, it is practical that the first transmitting bus or the first address bus be connected via a first group of buffer memories to the first group of the memory cells and the second transmitting bus or the second address bus be connected via a second group of buffer memories to the second group of memory cells, that the first group of buffer memories or the second group of buffer memories are controlled with a first, or respectively, second memory signal which coincides with pulse edges of the first, or respectively, second clock pulse signal and the sequence of the first and second write commands is generated after the appearance of the first or second memory signals and simultaneously with a preset binary value of the second or first clock pulse signal.

This embodiment of the invention of a coupling device distinguishes itself in that the two address generators for the generation of the addresses for the first address bus and for the second address bus can operate independently of one another, so that, for example, no clock pulse recovery circuit is required, with the help of which a phase-related coincidence of the two clock pulse signals could be established.

In the case that, in addition to data, also test loop signals are to be transmitted for the connection of test loops, it is practical that a third group of memory cells be provided, the data inputs of which are connected to a test signal bus, the data outputs of which are connected to a test loop control stage and which are connected to the decoding lines of the first group of memory cells or the second group of memory cells. Two switches are provided which, in a first switch position, connect the second transmitting bus with the data inputs of the second group of memory cells and the data outputs of the first group of memory cells with the second receiving bus, respectively, the first transmitting bus with the data inputs of the first group of memory cells and the data outputs of the second group of memory cells with the first receiving bus. The two switches in their second switch position connect the data outputs of the first group of memory cells via a test loop to the data inputs of the second group of memory cells and connect the data outputs of the second group of memory cells via the test loop to the data inputs. With the test loop control stage, in the case of a lack of a test signal or in the presence of a test signal, the first or second switch position is adjusted.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
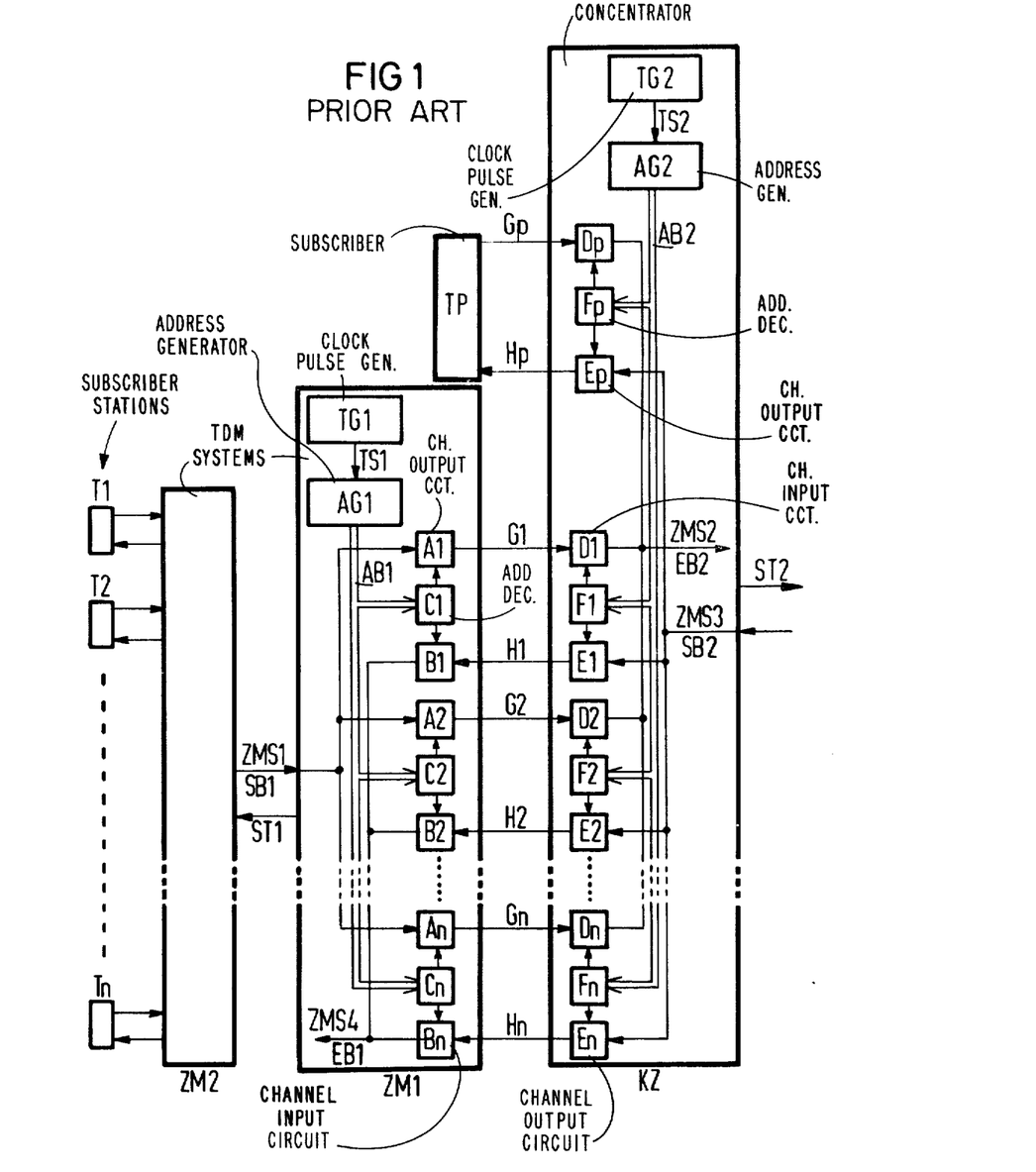
FIG. 1 illustrates a known coupling device for coupling a time-division multiplex system to a concentrator.

FIG. 1 illustrates data transmission devices, with the help of which, on the one hand, the data of the subscriber stations T1, T2 . . . Tn are transmitted via the time-division multiplex system ZM2, a transmission link ST1, a time division multiplex system ZM1, a concentrator KZ and a transmission link ST2 to a plurality of data devices (not shown). On the other hand, the data from such data devices are transmitted via the transmission link ST2, the concentrator KZ, the time division multiplex systems ZM1, ZM2 to the subscribers T1--Tn. The transmission link ST2 can, for example, be connected to a switching system or to a further (not illustrated) concentrator.

The time-division multiplex system ZM1 and the subscriber Tp can be several meters to several hundred meters removed from concentrator KZ. The time-division multiplex system ZM1 and the subscriber Tp therefore lie in the local range of the concentrator KZ and are connected directly to the concentrator KZ. Further removed subscribers in the nature of the subscribers T1--Tn can be connected with the aid of the time-division multiplex systems ZM1, ZM2 to the concentrator. Thereby, the subscribers T1--Tn in principle can be randomly far removed from the time-division multiplex system ZM1.

In the time-division multiplex system ZM1 there is provided a plurality of channel output circuits A1, A2 . . . An, a plurality of channel input circuits B1, B2 . . . Bn and a plurality of address decoders C1, C2 . . . Cn. By way of the transmitting bus SB1, the time-division multiplex signal ZMS1 originating from the subscribers T1--Tn is transmitted to the channel output circuits A1--An. The time slots of the time-division multiplex signals ZMS1 are associated with the individual subscribers. Seen from the concentrator KZ, the association of the individual time slots to the individual subscribers is irrelevant. Here, several alternatives which are known per se can be differentiated.

According to a first alternative, the data of the individual subscribers can be transmitted with equal speeds and in a preset bit grid. During the interval of a single bit, in this case, the data of all subscribers are taken over consecutively in time in each case in one time slot of the time-division multiplex signal. In the case of a total of n subscribers, there are provided n channel output circuits A1-An, channel input circuits B1--Bn and address decoders C1--Cn. Within a time-division multiplex frame, therefore, in each case one bit of each subscriber is transmitted.

According to a second alternative, the data of the subscribers can be transmitted with equal speed, however, not within a preset bit grid. In this case, within the time-division multiplex system ZM2, a known device (not illustrated) is provided, with the help of which a time-division signal is generated, the time slots of which, as in the first alternative, are associated in a predetermined order to the individual subscribers. Again, within the time-division multiplex frame, in each case, one bit of each subscriber is transmitted.

According to a further alternative, the data of the subscribers can be transmitted at different speeds synchronously or non-synchronously to the time-division multiplex system ZM2. Also in these cases, with the help of known devices arranged within the time-division multiplex system ZM2, time-division multiplex signals are generated, the time slots of which are associated to the subscribers, whereby, however, within a time-division multiplex frame, all the more time slots are associated to the individual subscribers, the greater the speed is with which the subscriber transmits the data. Under these prerequisites, fewer subscribers are provided than channel output circuits, channel input circuits or address decoders.

For the sake of a simple presentation, according to FIG. 1, the time-division multiplex signal ZMS1 proceeds directly to the transmitting bus SB1; the customarily-required transmission devices, regenerating devices and synchronizing devices are therefore not illustrated.

The clock pulse generator TG1 generates the clock signal TS1 and in the address generator AG1 addresses are generated which are associated to the individual time slots of the time-division multiplex signal ZMS1. These addresses are transmitted via the address bus AB1 to the address decoders C1--Cn. When the associated address appears at an address decoder, then the address decoder transmits a decoding signal and activates the channel output circuit which is connected thereto. The channel output circuit then stores the bit of the address time slot. As a channel output circuit, for example, flip-flops can be provided, by way of whose output lines G1, G2 . . . Gn the stored data are transmitted.

The concentrator KZ comprises a clock pulse generator TG2, an address generator AG2, channel input circuits Dp, D1, D2 . . . Dn, channel output circuits Ep, E1, E2 . . . En and address decoders Fp, F1, F2 . . . Fn. The clock pulse generator TG2 generates the clock signal TS2 and the address generator AG2 transmits addresses via the address bus AB2 serially. Each address is associated with a respective address decoder, which with calling up the associated address transmits a decoding signal. With this decoding signal, the associated channel input circuit is activated. When, for example, the address decoder F1 transmits a decoding signal, the channel input circuit D1 is activated and during the interval of the address takes over the bit supplied via the line G1. To the outputs of the channel input circuits D1 ... Dn, the receiving bus EB2 is connected, by way of which the time-division multiplex signal ZMS2 is transmitted, the time slots of which are associated with the channel input circuits Dp, D1, D2 ... Dn.

In the opposite direction, via the transmission link ST2, a further time-division multiplex signal ZMS3 is carried on the transmitting bus SB2. The channel output circuits Ep, E1, E2 ... En operate, in principle, like flip-flops and with the serial call-up of the addresses are activated with the associated decoding signals. The bits stored in each case in the output channel circuits are transmitted by way of the output lines Hp, H1, H2 ... Hn.

The channel input circuits B1, B2 ... Bn are activated in the case of serial call-up of the addresses. By way of the receiving bus EB1, the time-division multiplex signal ZMS4 is transmitted, the time slots of which in each case are associated with the individual channel input circuits. The time-division multiplex signal ZMS4 is transmitted to the time-division multiplex system ZM2 and the data of the individual time slots are forwarded to the subscribers T1--Tn.

Figure 2:
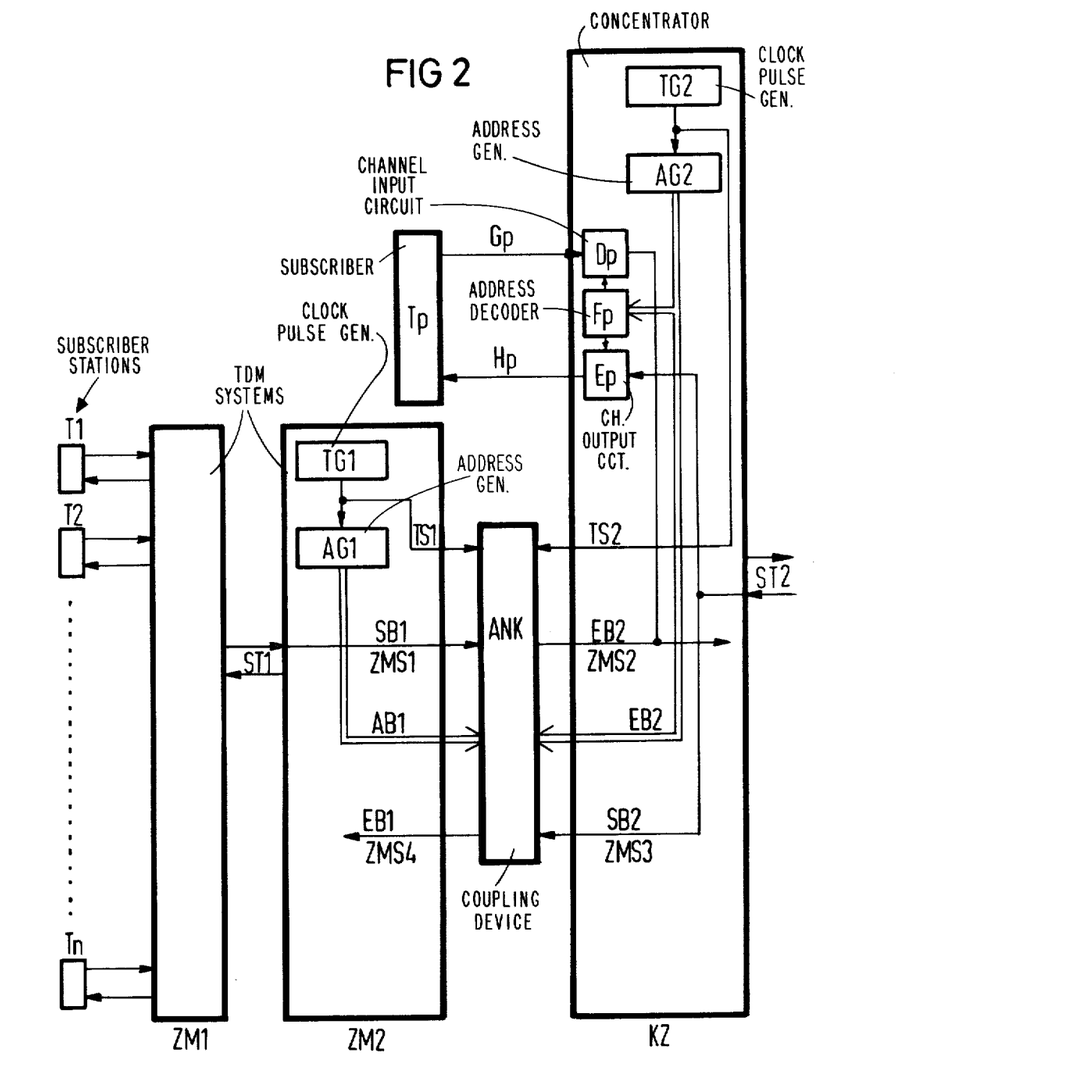
FIG. 2 is a schematic block diagram of an exemplary embodiment of a coupling device constructed in accordance with the present invention.

FIG. 2 also illustrates data transmission devices; however, it differs from the data transmission devices shown in FIG. 1 with respect to the coupling device ANK. The transmitting bus SB1, the address bus AB1, the receiving bus EB1 and a clock pulse line TS1 are connected to one side of the coupling device AK and a clock pulse line TS2, the receiving bus EB2, the address bus AB2 and the transmitting bus SB2 are connected to the other side of the coupling device.

Figure 3:
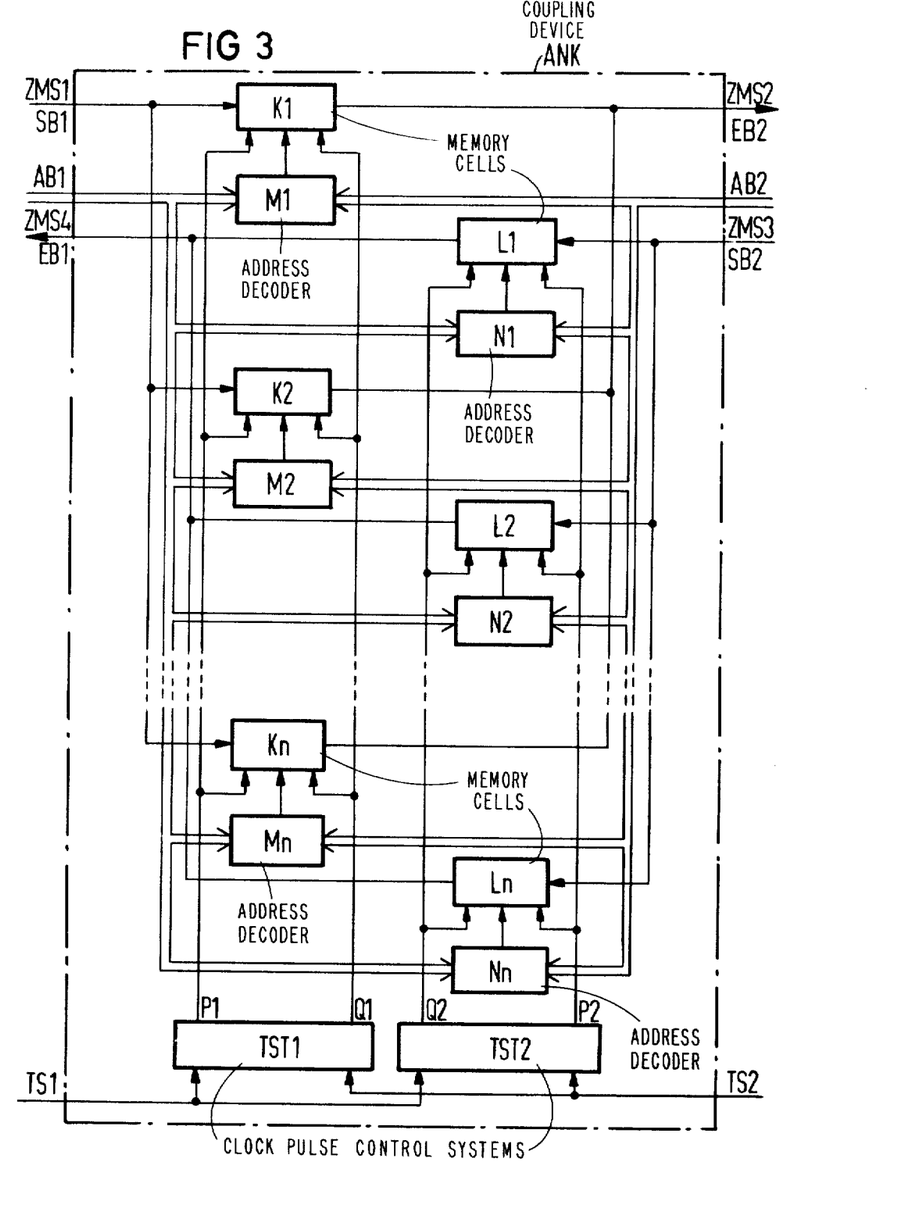
FIG. 3 is a schematic representation of an exemplary embodiment of the coupling device.

FIG. 3 illustrates an exemplary embodiment of the coupling device ANK schematically shown in FIG. 2. Per time slot of the time-division multiplex system ZM2 of FIG. 2 there is provided, in each case, a first group of memory cells K1, K2 ... Kn and a second group of memory cells L1, L2 ... Ln. The memory cells K1, K2 ... Kn are connected via their data inputs to the transmitting bus SB1 and via their outputs to the receiving bus EB2. The memory cells L1, L2 ... Ln are connected via their data inputs to the transmitting bus SB2 and via their data outputs to the receiving bus EB1. The memory cells of the first group are controlled with the aid of addresses decoders M1, M2 ... Mn, while the memory cells of the second group are controlled with the help of the address decoders N1, N2 ... Nn. With the aid of the clock pulse control systems TST1, TST2, the write commands P1, P2 and the read commands Q1, Q2 are generated.

The coupling device ANK illustrated in FIG. 3 fulfills the same function as the channel output circuits A1--An, E1--En, the channel input circuits B1--Bn and D1--Dn, the address decoders C1--Cn, F1--Fn and the lines G1--Gn and H1--Hn illustrated in FIG. 1. The coupling device ANK distinguishes itself, however, by its lower expense, because per time slot only two memory cells are provided, for example the memory cells K1 and L1, whereas in FIG. 1 per time slot, two channel output circuits and two channel input circuits, for example, the channel output circuits A1, E1 and the channel input circuits B1, D1 are required. A further advantage of the coupling device ANK can be found in the smaller amount of wiring and lower cost of wiring connected thereto. According to FIG. 1, per time slot, in each case two lines must be provided, for example the lines G1 and H1, so that in the case of 48 time slots, a total of 96 lines are required. If for the address buses AB1 and AB2 in each case six lines are required, then according to FIG. 3, for the transmitting bus SB1, the receiving bus EB1, the clock pulse signal line TS1, the receiving bus EB2, the transmitting bus SB2, the clock pulse signal line TS2, in each case one line is required, for the address buses AB1 and AB2, in each case six lines, thus a total of 18 lines are required.

Figure 4:
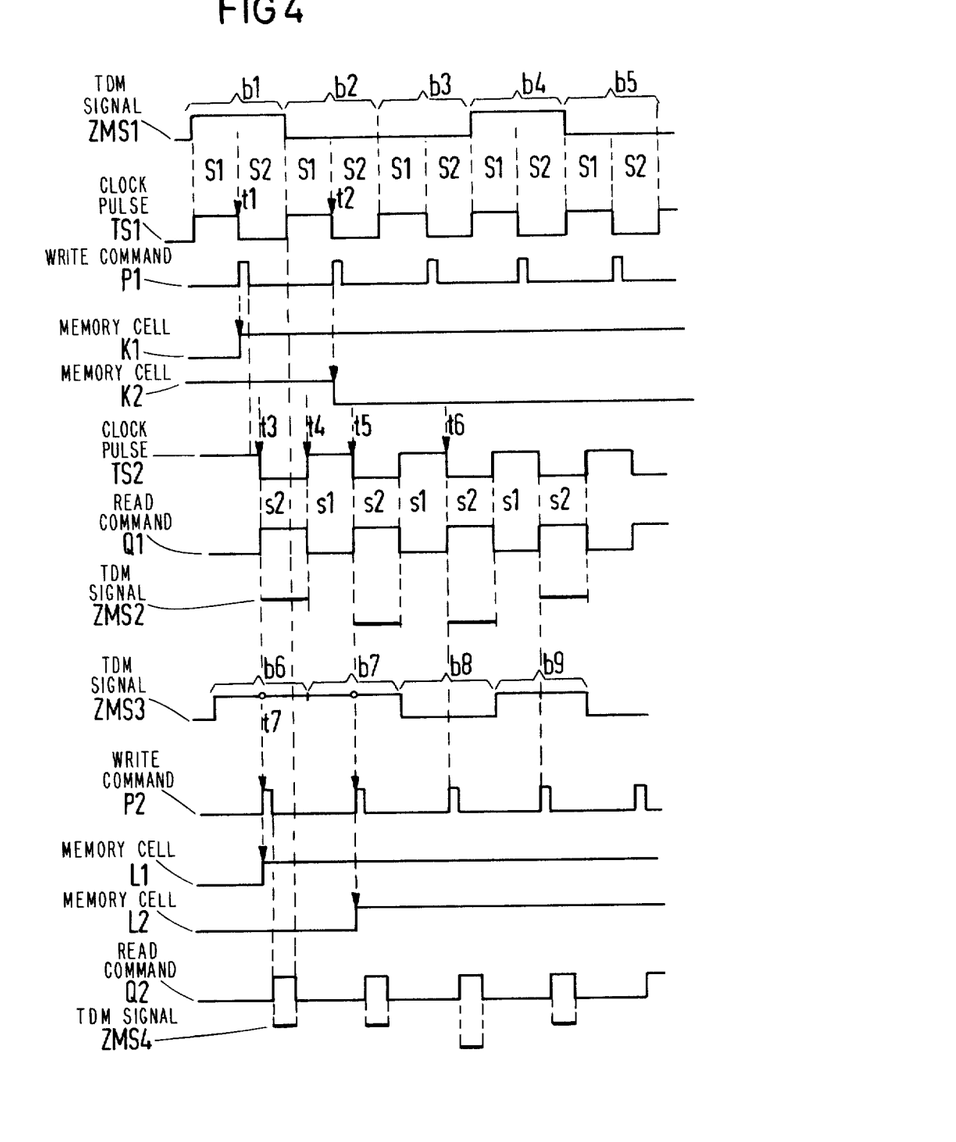
FIG. 4 is a pulse diagram illustrating several signals which appear during the operation of the coupling device of FIG. 3.

FIG. 4 illustrates a plurality of signals which indicate the manner of operation of the coupling device ANK of FIG. 3. In particular, in FIG. 4, the time-division multiplex signals ZMS1, ZMS2, ZMS3 and ZMS4 are illustrated. In the case of this exemplary embodiment, it is assumed that the time-division multiplex signal ZMS1, according to FIG. 2, is transmitted via a transmission link ST1 and the first transmitting bus SB1, that the time-division multiplex signal ZMS2 is transmitted via the second receiving bus EB2 and the transmission link ST2, that the time-division multiplex signal ZMS3 is transmitted via the transmission link ST2 and the second transmitting bus SB2 and that the time-division multiplex signal ZMS4 is transmitted via the first receiving bus EB1 and the transmission link ST1. In contrast to this, in the case of practically-realized exemplary embodiments, the time-division multiplex signals ZMS1 and ZMS4 appear only in the vicinity of the time-division multiplex system ZM2, whereas via the transmission link ST1, the time-division multiplex signals are transmitted, the bit rates of which differ from the bit rates of the time-division multiplex signals ZMS1 and ZMS4. Also, the time-division multiplex signals ZMS2 and ZMS3 in the case of practically-realized exemplary embodiments can appear only in the vicinity of the concentrator KZ and with respect to their bit rates, can be different from those time-division multiplex signals which are transmitted via the transmission link ST2. These varying bit rates of the time-division multiplex signals ZMS1, ZMS2, ZMS3, ZMS4, on the one hand, and the time-division multiplex signals in the vicinity of the transmission links ST1 and ST2, on the other hand, will not be dealt with in greater detail herein, because all that is important in connection with the present invention are the time-division multiplex signals ZMS1, ZMS2, ZMS3, ZMS4 in the vicinity of the time-division multiplex system ZM2, or, respectively, in the vicinity of the concentrator KZ and rate transformations of these time-division multiplex signals do not fall within the framework of the present discussion.

In FIG. 4, the time-division multiplex signal ZMS1 is illustrated having the binary values b1, b2, b3, b4, b5 which appear within consecutive time slots. The time slots are set by the addresses which are transmitted via the address bus AB1. To each address and to each time slot there is also a period of clock pulse signal TS1 associated. Each period of the clock pulse signal TS1 comprises two portions, the period which is associated with the binary value b3 comprises, for example, portions S1 and S2. These portions are defined by the binary values of the clock pulse signal TS1. The first portion S1 of the period is characterized by a "1" and the second portion S2 of the period is characterized by a "0" of the clock pulse signal TS1. In the case of this exemplary embodiment, the two portions S1 and S2 are equally large, so that the negative pulse edges of the clock pulse signals TS1 lie centrally of the individual time slots. Generally, this is not the case. It would also be conceivable to associate a "0" with the first portion S1 and a "1" with the second portion S2.

It is assumed in this exemplary embodiment that the two clock pulse signals TS1 and TS2 have the same pulse repetition rate, but are, however, displaced with respect to one another in phase. For example, the illustrated phase portion of the clock pulse signal TS2 is assumed. All periods of this clock pulse signal TS2 also comprise two portions, which are differentiated by binary values of the clock pulse signal TS2. In the case of this exemplary embodiment, to the first part s1, a "1" is assigned and a "0" is assigned to the second part s2. This association is random, however, and it would be basically conceivable to associate a "0" with the portions s1 and a "1" with the portion s2.

The coupling device illustrated in FIG. 3 has the purpose of storing the individual binary values of the time-division multiplex signal ZMS1 one after the other in time in the tempo of the clock pulse signal TS1 and thereafter to read the binary signals at the tempo at the clock pulse signal TS2. Thereby, the individual binary values of the time-division multiplex signal will always be read-in during the second portion S2 of the clock pulse signal TS1 and always read-out during the second portion S2 of the clock pulse signal TS2. It has proved to be advantageous to transfer the individual binary values b1, b2, etc of the time-division multiplex signal ZMS1 in each case at the end of the second portions S2 into the memory cells K1--Kn. For the purpose of a presentation with a good overview, according to FIG. 4, the negative pulse edges of the clock pulse signal TS1 are illustrated in the center of the individual time slots and binary values and write commands P1 are derived with these negative edges of the clock pulse signal TS1. It is assumed that the address call-up at the time t1 is associated with the address decoder M1 and that at the time t1, a decoding pulse is transmitted to the memory cell K1. With the simultaneously-transmitted write command P1, the binary value b1 is stored in the memory cell K1. This storage occurs therefore during the second portion S2 of the clock pulse signal TS1 assigned to the binary value b1.

At the time t2, the address decoder M2 transmits a decoding pulse ab and with a simultaneously-appearing write command P1, the binary value b2 is transferred into the memory cell K2. In this manner, in sequence, also all further binary values of the time-division multiplex signal ZMS1 are transferred into the further memory cells.

The binary values stored in the memory cells K1--Kn can be read at the earliest following the storage commands P1 and should, as already mentioned, be undertaken during the second portions s2 and during the "0" values of the clock pulse signal TS2. One of the read commands Q1 is therefore generated with the help of the clock pulse control system TST1 in that its leading edge appears at the time t3 and its trailing edge at the time t4. By way of the address bus AB2, the address decoder M1 receives the associated address and during the second portion s2 of the associated period of the clock pulse signal TS2 transmits a decoding pulse to the memory cell K1; with this assumption, with the read command Q1, the illustrated "1" of the time-division multiplex signal ZMS2 is transmitted. In a similar manner, from the time t5 and from the time t6, further binary values of the time-division multiplex signals ZMS2 are generated. This time-division multiplex signal ZMS2 is only partially illustrated because the portions of the signal not illustrated are irrelevant. A receiver of the time-division multiplex signals ZMS2 is adjusted such that it only evaluates the illustrated binary values of the time-division multiplex signal ZMS2. The time-division multiplex signal ZMS2 signals, with very slight phase displacement, the same binary values as the time-division multiplex signal ZMS1.

The time-division multiplex signal ZMS3 is supplied via the transmitting bus SB2. The individual bits b6, b7, b8, b9 should be taken over into the memory cells L1--Ln. The writing of these bits occurs during the portions s2 of the clock pulse signal TS2. The read-out of these bits occurs during the appearance of the portions S2 of the clock pulse signal ZMS1. With the help of the clock pulse control system TST2 which is illustrated in FIG. 3, first the sequence of the write command P2 is generated; the leading edges of the write command P2 coincide with the negative edges of the clock pulse signal TS2. At the time t7, the decoder N1 receives the associated address via the address bus AB2 and transmits a decoding pulse. With a simultaneously-appearing write command P2, the binary value b6 of the time-division multiplex signal ZMS3 is stored in the memory cell L1. In a similar manner, at the time t8, the binary value b7 is stored in the memory cell L2. The read commands Q2 are generated in that, on the one hand, they appear after the write command P2 and, on the other hand, they appear during the portions S2. When the address associated with the decoder N1 is called up, it provides a decoding pulse to the memory cell L1 and with the help of a read command Q2, the binary value b6 is taken over into the time-division multiplex signal ZMS4. In a similar manner, the binary value b7 is inserted into the time-division multiplex signal ZMS4. Also, only those relevant portions of the time-division multiplex signal ZMS4 are illustrated which are evaluated by the subscribers T1--Tn which are illustrated in FIG. 1.

Figure 5:
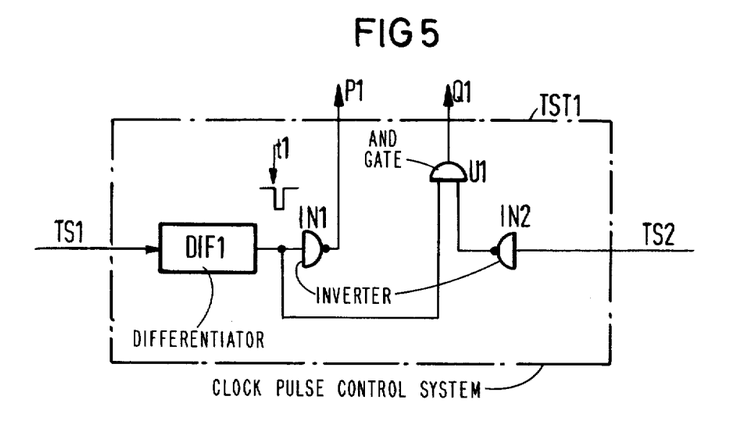
FIG. 5 is a logic circuit diagram of an exemplary embodiment of the first clock pulse system of FIG. 3.

FIG. 5 illustrates an exemplary embodiment of the clock pulse control system TST1 which is schematically illustrated in FIG. 3. With the help of a stage DIF1, the clock pulse signal TS1 is differentiated and with the help of a rectifier, the positive pulses arising from differentiation are suppressed and only the negative pulses are transmitted. For example, at the time t1, one of these negative pulses is transmitted, which is inverted with the help of an inverter IN1 and is transmitted as a write command P1. With the help of an inverter IN2, the clock pulse signal TS2 is inverted. The AND gate U1 receives the inverted write command P1 and the inverted clock pulse signal TS2 so that the read command Q1 can only be transmitted when no write command P1 is present and when the clock pulse signal TS2 has a "0" value.

Figure 6:
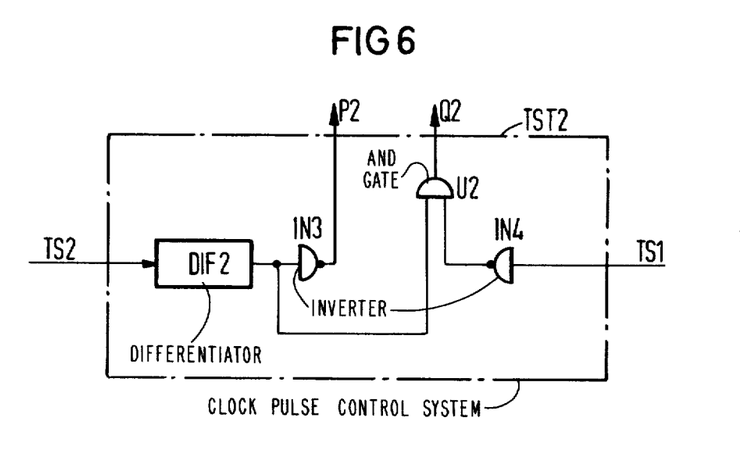
FIG. 6 is a logic circuit diagram of the second clock pulse control system illustrated in FIG. 3.

FIG. 6 illustrates an exemplary embodiment of the clock pulse control system TST2 illustrated in FIG. 3. With the help of a differentiating stage DF2, the clock pulse signal TS2 is differentiated and rectified, so that the positive pulses arising during differentiation are suppressed and only the negative pulses are transmitted. By way of an inverter IN3, the negative pulses are inverted, so that the write commands P2 result. An AND gate U2 receives the clock pulse signal TS1 which was inverted with an inverter IN4 and the output signal of the stage DIF2. The read commands Q2 which were transmitted from the AND gate U2 can only appear when, on the one hand, no write command P2 is present and, on the other hand, when a "0" value of the clock pulse signal TS1 is present.

Figure 7:
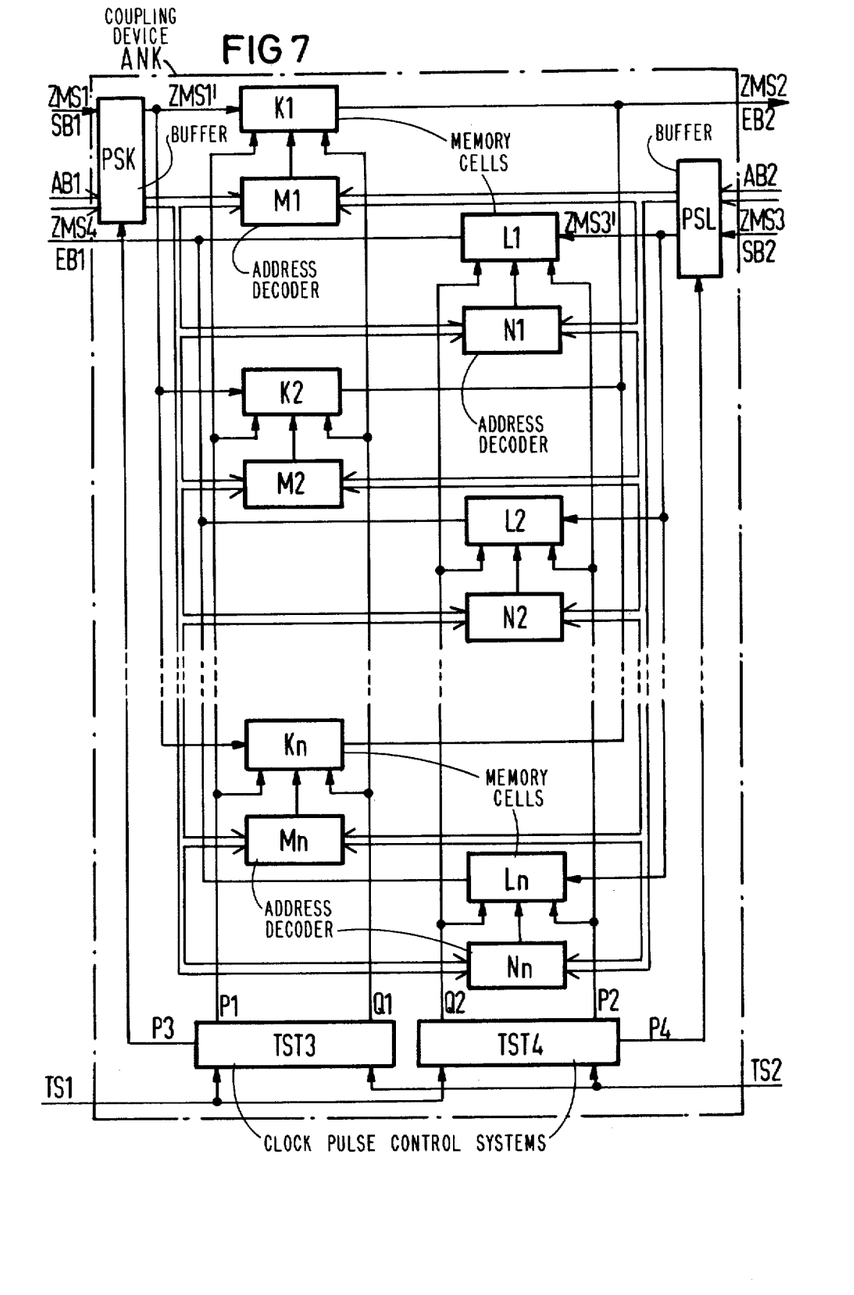
FIG. 7 is a schematic representation of a coupling device having buffer memories.

FIG. 7 illustrates a further exemplary embodiment of the coupling device ANK which is schematically illustrated in FIG. 2. It is assumed in the use of the coupling device that the periods of the clock pulse signals TS1 and TS2 are different. During a rather long time interval, these clock pulse signals TS1 and TS2 however have equal mean pulse repetition rates. FIG. 7 differs from FIG. 3 by the illustrated buffer memories PSK and PSL and by the clock pulse control systems TS3 and TS4. The pulses of the signal P3 coincide with the negative pulse edges of the clock pulse signal TS1. With the pulses of the signal P3, the buffer memory PSK takes over the individual binary values of the time-division multiplex signal ZMS1 and stores the same until the next pulse of the signal P3. In this manner, the delayed time-division multiplex signals ZMS1' results. The individual binary values of the addresses supplied over the address bus AB1 are intermediately stored in a similar manner in the buffer memory PSK. When, for example, the address bus AB1 comprises six lines, then the buffer memory PSK contains six memories for the storage of the addresses and one memory for the storage of the time-division multiplex signal ZMS1. All memories of the buffer memory PSK are controlled with the same signal P3.

Figure 8:
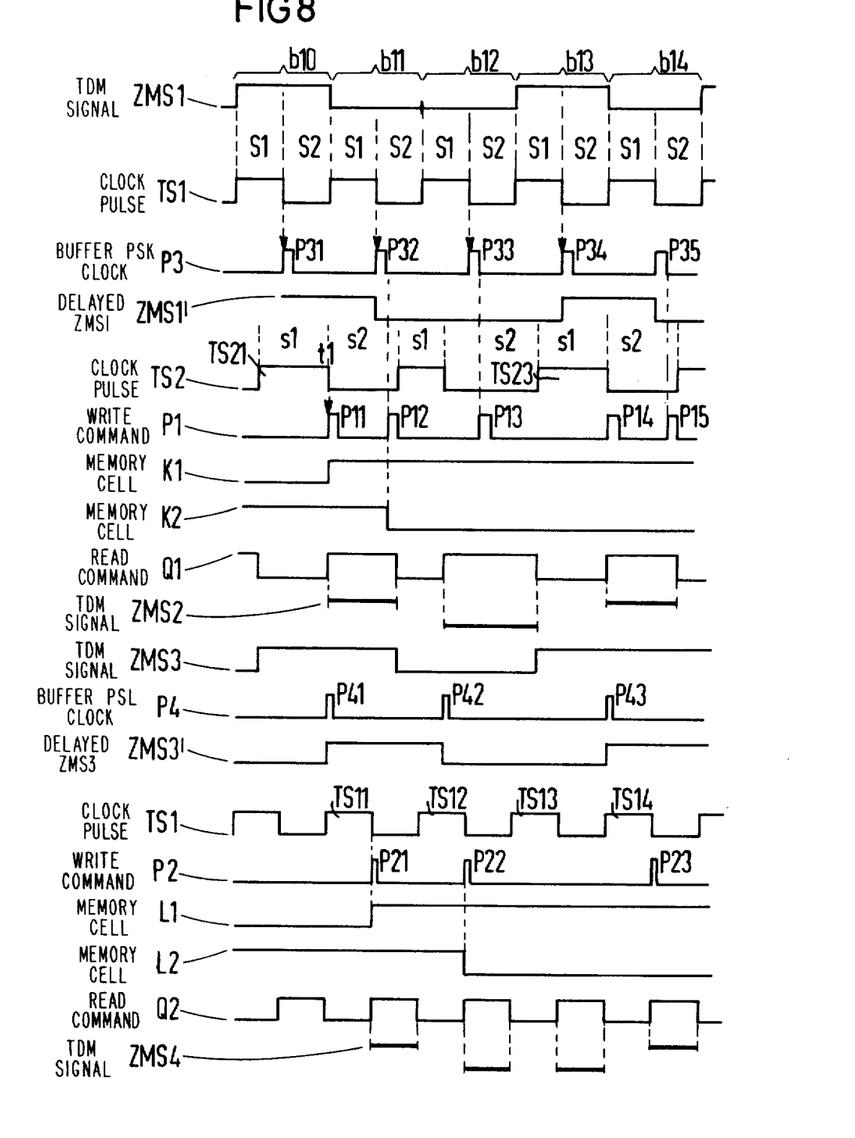
FIG. 8 is a pulse diagram illustrating several signals which appear during the operation of the coupling device of FIG. 7.

Similarly to FIG. 4, and also according to FIG. 8, the periods of the clock pulse signal TS1 are subdivided into portions S1 and S2. These two portions are, in general, not equally large and the negative pulse edges of the clock pulse signal TS1, in general, do not appear in the center of the binary values b10, b11, b12, b13, and b14. Also, the period duration of the clock pulse signal TS2 is divided into a first portion s1, and a second portion s2. The individual bits of the time division multiplex signal ZMS1 are to be stored again during the interval of the portions S2 and read during the portions s2. The write commands P1 are generated in that, on the one hand, they appear after the pulse of the pulse sequence P3 and, on the other hand, during the portion s2 of the clock pulse signal TS2 which follows. For example, the write command P11 can therefore be generated, at the earliest, shortly after the time t1, because the pulse TS21 prevents an earlier generation. On the other hand, the write command P12 can appear directly after the pulse P32 because, at this time, a portion s2 of the clock pulse signal TS2 is provided. In a similar manner, the write commands P13, or respectively, P15 are generated directly after the corresponding pulses P33, or respectively, P35. The write command P14, on the other hand, must be generated with a certain delay, because the portion s1 in the form of the pulse TS23 prevents an earlier generation of the write command P14.

With the help of the write commands P1, simultaneously-appearing binary values of the delayed time-division multiplex signal ZMS1' are transferred into the corresponding memory cells K1, K2 . . . Kn.

With the help of the clock pulse control system TS3, the read commands Q1 are generated, which are inverted in comparison to the clock pulse signal TS2. The information stored in the flip-flop stages K1--Kn, as in the case of FIG. 3, are always read when, on the one hand, a decoding signal of the associated address decoder M1--Mn is present and when, on the other hand, a read command Q1 appears. In this manner, the binary values of the time-division multiplex signal ZMS2, illustrated in FIG. 8, are transmitted by way of the outputs of the memory cells K1-Kn.

By way of the transmitting bus SB2, the time-division multiplex signal ZMS3 is fed into the buffer memory PSL. The pulses of the signal P4 coincide with the negative pulse edges of the clock pulse signal TS2. With the pulses of the signal P4, the buffer memory PSL receives the individual binary values of the time-division multiplex signal ZMS3 and stores the same until the next pulse of the signal P4. In this manner, there results a delayed time-division multiplex signal ZMS3'. The individual binary values of the addresses supplied by way of the address bus AB2 are intermediately stored in a similar manner in the buffer memory PSL. When, for example, the address bus AB2 comprises six lines, then the buffer memory PSL contains six memories for the storage of the addresses and one memory for the storage of the time-division multiplex signal ZMS3. All memories of the buffer of the buffer memory PSL are controlled with the same signal P4. The write commands P2 are generated in that they appear, on the one hand, after the pulses P4 and, on the other hand, do not coincide with the portions S1 of the clock pulse signal TS1. The write commands P21, or respectively, P22, or respectively, P23 are therefore generated delayed after the corresponding pulses P41, or respectively, P42, or respectively, P43 and specifically in such a manner that they do not coincide with the pulses TS11, or respectively TS12 or respectively, TS14. The memory cells L1--Ln with the write pulses P21, P22, P23 etc. take over the individual binary values of the delayed time-division multiplex signal ZMS3'. The read commands Q2 are the same as the inverted clock pulse signal TS1. With the help of the read commands Q2, the contents of the memory cells L1--Ln are read and produce the individual binary values of the time-division multiplex signal ZMS4.

Figure 9:
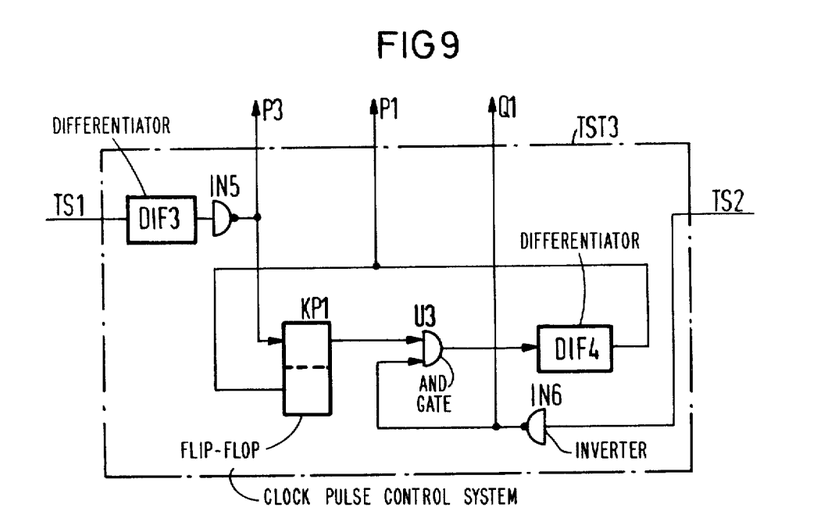
FIG. 9 is a schematic logic diagram of the clock pulse control system TST3 illustrated in FIG. 7.

FIG. 9 illustrates an exemplary embodiment of a clock pulse control system TST3 which is schematically illustrated in FIG. 7. The clock pulse signal TS1 is differentiated in a differentiating stage DIF3 and rectified so that the negative pulse portions are suppressed. After inversion at an inverter IN5, the individual pulses of the signal P3 result. The read pulses Q1 are inverted in comparison to the clock pulse signal TS2. The write commands P1 are obtained with a flip-flop stage KP1, an AND gate U3, an inverter IN6 and a differentiating stage DIF4. The stage DIF4 differentiates the output signal of the AND gate U3 and rectifies the same to provide a suppression of the negative pulse portions. Because of the inverter IN6, via the output of the AND gate U3, an output signal is transmitted only when a "0" value of the clock pulse signal TS2 is present. The write commands P1 generated with the help of the stage DIF4 can therefore appear only during the duration of the "0" values of the clock pulse signal TS2. The flip-flop stage KP1 is set by the pulses P3 and is reset by the pulses P1. For example, the flip-flop stage KP1 with the pulse 31 is set such that, via its output, a "1" value is transmitted to the AND gate U3. This "1" value can not however bring about an output signal at the AND gate U3, because a "0" value is present from the inverter IN6. The flip-flop stage KP1, therefore, causes a delay of the write commands P11 and P14 which are specified with the use of FIG. 8.

Figure 10:
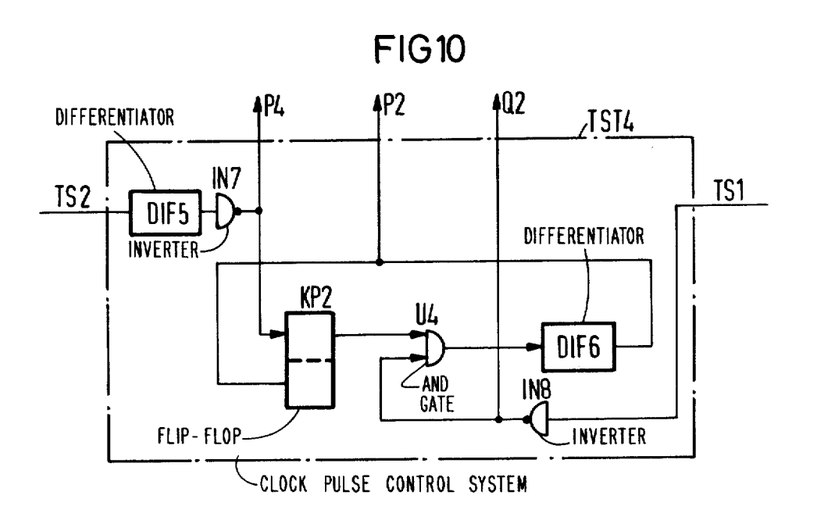
FIG. 10 is a schematic logic diagram of the clock pulse control system TST4 of FIG. 7.

FIG. 10 illustrates an exemplary embodiment of the clock pulse control system TST4 which is schematically illustrated in FIG. 7. The differentiating stage DIF5 and the inverter IN7 correspond to the stage DIF3 and the inverter IN5 of FIG. 9. The clock pulse signal TS2 is differentiated with the stage DIF5 and rectified to suppress the positive pulse portions. The negative pulse portions are inverted with the help of the inverter IN7, so that the pulses of the signal P4 results. The signal Q2 is inverted in comparison to the clock pulse signal. The write commands P2 are generated with the help of a flip-flop stage KP2, with an AND gate U4, an inverter IN8 and a differentiating stage DIF6. The inverter IN8 prevents the generation of the "1" write commands P2 during the time interval of the "1" values of the clock pulse signal TS1. Where applicable, the flip-flop stage KP2 causes a delay of the individual write commands. For example, the write commands P21 and P23 illustrated in FIG. 8 are generated delayed with the help of the flip-flop KP2.

Figure 11:
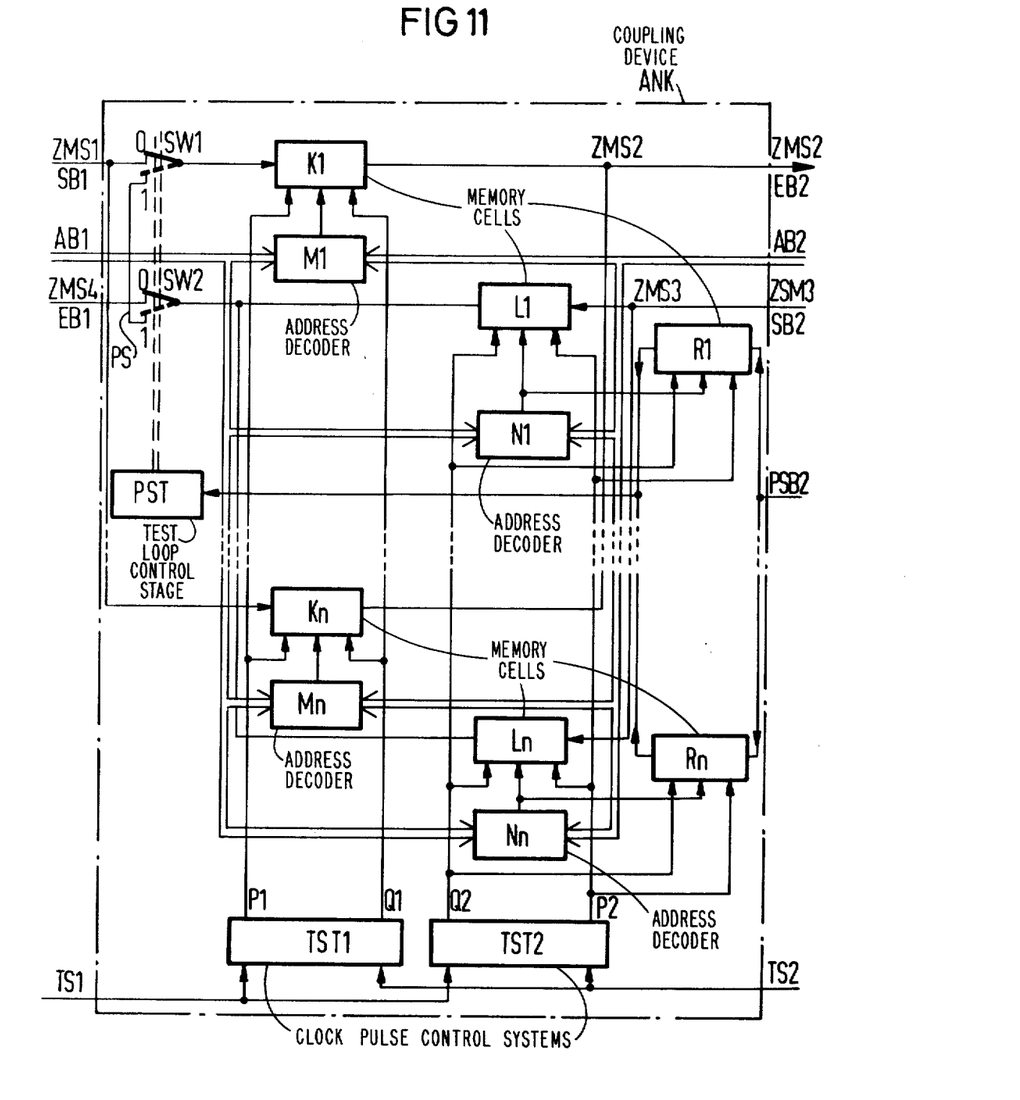
FIG. 11 is a schematic representation of another embodiment of a coupling device with a test loop.

FIG. 11 illustrates the further exemplary embodiment of a coupling device of the type schematically illustrated in FIG. 2, which is particularly appropriate when test loops are to be closed. In addition to the transmitting bus SB2, a test loop bus PSB2 is provided, by way of which test loop signals can be transmitted serially during the time duration of the individual time slots. These test loop signals comprise, in each case, only a single bit, whereby, for example, a "0" value may signify no connection of the test loop and a "1" value may signify a connection of the test loop. In addition to the memory cells L1--Ln, a plurality of memory cells R1---Rn are provided, which are operated with the same decoding pulses as the corresponding memory cells L1--Ln. In addition, the memory cells R1--Rn are controlled with the write pulses P2 and with the read pulses Q2. All outputs of the memory cells R1--Rn are connected to a test loop control stage PST. When, for example, according to FIG. 4, during the interval of the bit b6, a "0" signal is transmitted over the test loop bus PSB2, then the "0" signal is received at the time t7 by the memory cell R1. Shortly after the time t7, this "0" signal is read with a read command Q2 and is applied to the test loop control stage PST. The test loop control stage PST adjusts the corresponding "0" positions of two switches SW1 and SW2, so that the test loop PS is disconnected.

When, on the other hand, during the interval of the bit b6, a "1" signal is supplied via the test loop bus PSB2, the memory cell R1 stores a signal from the time t7, which signal resembles the signal L1 of FIG. 4. After the time t7, with the read command Q2, the "1" signal of the memory cell R1 is read and with the help of the test loop control stage PST, the two "1" positions of the switches SW1 and SW2 are set. Therefore, the test loop PS is closed, at least during the time duration of this single time slot and the pertaining bit of the time-division multiplex signal ZMS4 is supplied via the switch SW2, the test loop PS and the switch SW1 to the data input of the memory cell K1. Thereby, the switches SW1 and SW2, with the help of the test loop control stage PST, are activated prematurely within the pertaining time slot in such a manner that the bit of the time-division multiplex signals ZMS4 which follows is reliably fed via the test loop PS to the memory cell K1. The test loop PS is always closed again during the time slot associated with the bit b6 as long as a "1" signal is stored in the memory cell R1. Then, via the one time slot, consecutively in time, a longer test text can be transmitted. Independently of this, the test loop PS can be either closed or opened during the remaining time slots, depending upon the signals which are stored in the memory cells R1--Rn.

The test loop PS illustrated in FIG. 11 can also be operated in combination with the coupling device illustrated in FIG. 7. In this case, the test signal bus PSB2 is supplied to the buffer memory PSL of FIG. 7 and the output of the buffer memory is connected to the data input of the memory cells R1--Rn illustrated in FIG. 11. The switches SW1 and SW2 illustrated in FIG. 11 in their "0" switch positions, on the one hand, connect the first transmitting bus SB1 with the buffer memory PSK and, on the other hand, connect the data outputs of the memory cells L1--Ln with the first receiving bus EB1. In their "1" switch positions, the two switches SW1 and SW2 connect the outputs of the memory cells L1--Ln with the first transmitting bus SB1 via a test loop. Therefore, this test loop, as seen from the first transmitting bus SB1, is still connected before the buffer memory PSK. The two switches illustrated in FIG. 11 are controlled with the help of the test loop control stage PSK and this test loop control stage is connected to the output of the memory cells R1--Rn.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A coupling device for coupling a time-division multiplex system to a concentrator of a data processing system, comprising:
    a first data transmission bus, a first address bus, a first data receiving bus and a first clock line in the area of the time-division multiplex system;
    a second data transmission bus, a second address bus, a second data receiving bus and a second clock line in the area of the concentrator;
    a plurality of first memory cells in the coupling device wherein a first memory cell is provided for each address of the first address bus;
    a plurality of second memory cells in the coupling device wherein a second memory cell is provided for each address of the second address bus;
    a group of said first memory cells connected by way of their data inputs to said second data transmission bus and by way of their data outputs to said second data receiving bus;
    a group of said second memory cells connected by way of their data inputs to said second data transmission bus and by way of their data outputs to said first data receiving bus;
    a plurality of first address decoders and a plurality of second address decoders, said first group of memory cells and said second group of memory cells respectively connected to said first and second address decoders;
    said first and second address decoders connected to said first and second address buses, respectively;
    a first clock control and a second clock control respectively connected to said first and second clock lines, said first and second clock controls generating sequences of first and second write instructions, respectively, with which data appearing on said first and second data transmission buses, respectively, are transferred as addresses into said memory cells of said first and second groups of memory cells, respectively, and said first and second clock controls further operable to generate sequences of first and second read instructions for reading data from said memory cells of said first and second groups, respectively.

2. The device of claim 1, wherein said first and second clock pulse controls include means operable to respectively produce first and second write commands and clock pulse signals including predetermined pulse edges which coincide with the write commands, and first and second read commands generated after the respective write commands when the respective clock pulse signal is a predetermined binary value.

3. A coupling device of claim 1, further comprising,
 a first group of buffer memories connecting said first transmitting bus and said first address bus, respectively, to said first group of memory cells;
 a second group of buffer memories connecting said second transmitting bus and said second address bus, respectively, to said second group of memory cells;
 said first group of buffer memories and said second group of buffer memories, respectively, controlled with a first memory signal and a second memory signal, respectively, which coincides with pulse edges of said first and second clock pulse signals, respectively; and
 the sequence of said first and second write commands, respectively, is generated after the appearance of said first and second memory signals, respectively and simultaneously with a preset binary value of said second and first clock pulse signals, respectively.

4. The device of claim 1, and further comprising:
 a third group of memory cells each including a data input and a data output;
 a test signal bus connected to said data inputs of said third group of memory cells;
 a test loop control stage connected to said data outputs of said third group of memory cells, said data outputs also connected to the decoding lines of said first and second groups of memory cells, respectively;
 a pair of switches each including a first switch position connecting said second transmitting bus with said data inputs of said second group of memory cells and the data outputs of said first group of memory cells with said second receiving bus and, respectively, connecting said first transmitting bus with the data inputs of said first group of memory cells and said data outputs of said second group of memory cells with said first receiving bus, and a second switch position connecting said data outputs of said first group of memory cells via said test loop to said data inputs of said second group of memory cells and, respectively, connecting said data outputs of said second group of memory cells via said test loop to said data inputs; and
 a test loop control stage responsive to the lack of a test signal or to the presence of a test signal, to selectively set said first and second switches in said first and second switch positions.

* * * * *